(12) United States Patent
Balon et al.

(10) Patent No.: US 11,742,717 B2
(45) Date of Patent: Aug. 29, 2023

(54) MOTOR COOLING SYSTEM FOR E-BOOSTING DEVICE

(71) Applicant: Garrett Transportation I Inc, Torrance, CA (US)

(72) Inventors: Petr Balon, Pozorice (CZ); Philippe Renaud, Sanchey (FR); Baptiste Van Haesebroeck, Xonrupt-Longemer (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 365 days.

(21) Appl. No.: 16/950,015

(22) Filed: Nov. 17, 2020

(65) Prior Publication Data

US 2022/0158521 A1 May 19, 2022

(51) Int. Cl.
*H02K 5/20* (2006.01)
*H02K 9/19* (2006.01)

(52) U.S. Cl.
CPC .............. *H02K 5/20* (2013.01); *H02K 9/19* (2013.01)

(58) Field of Classification Search
CPC .......... H02K 1/20; H02K 1/16; H02K 1/2793; H02K 1/32; H02K 9/19; H02K 9/00; H02K 5/203; H02K 5/20; H02K 5/04
See application file for complete search history.

(56) References Cited

U.S. PATENT DOCUMENTS

| | | | |
|---|---|---|---|
| 4,297,784 A | 11/1981 | Vagman | |
| 6,964,250 B2 | 11/2005 | Wierl et al. | |
| 7,038,343 B2 | 5/2006 | Agnes et al. | |
| 7,767,105 B2 | 8/2010 | Uetsuji et al. | |
| 8,215,014 B2 | 7/2012 | Amburgey | |
| 9,130,421 B2 | 9/2015 | Chamberlin et al. | |
| 9,287,755 B2 | 3/2016 | Barker et al. | |
| 9,416,780 B2 | 8/2016 | Steele | |
| 9,450,468 B2 | 9/2016 | Chamberlin et al. | |
| 10,069,388 B2 | 9/2018 | Court et al. | |
| 2006/0045735 A1 | 3/2006 | Holdik et al. | |
| 2014/0265661 A1 | 9/2014 | Chamberlin et al. | |
| 2015/0295478 A1* | 10/2015 | Creviston | H02K 5/225 310/68 R |
| 2015/0381014 A1 | 12/2015 | Lee | |
| 2018/0076691 A1 | 3/2018 | Cheng | |
| 2018/0358849 A1 | 12/2018 | Saint-Michel et al. | |

(Continued)

FOREIGN PATENT DOCUMENTS

| | | |
|---|---|---|
| CN | 202260662 U | 5/2012 |
| CN | 102857047 B | 5/2015 |

(Continued)

*Primary Examiner* — Bryan R Perez
(74) *Attorney, Agent, or Firm* — LORENZ & KOPF, LLP

(57) ABSTRACT

A motor case for an electric motor of an e-boosting device is configured to be received within an outer housing to cooperatively define a coolant jacket. The motor case includes a shell member that at least partly defines a motor cavity for receiving the electric motor. The motor case also includes a dam member that is fixed to the shell member. The dam member projects from the shell member in an outboard direction from an outer surface of the shell member. The shell member and the dam member are configured to be received within the outer housing to define the coolant jacket and with the dam member partitioning the coolant jacket. The dam member is made of a different material from the shell member.

20 Claims, 8 Drawing Sheets

(56) References Cited

U.S. PATENT DOCUMENTS

2019/0273420 A1*  9/2019  Yasuda ................. H02K 5/203
2020/0076257 A1*  3/2020  Piazza Galarza ...... H02K 9/197
2020/0080470 A1   3/2020  Hehn et al.

FOREIGN PATENT DOCUMENTS

| CN | 204511977 U    | 7/2015 |
| CN | 109365633 A    | 2/2019 |
| DE | 202005008264 U1 | 9/2005 |
| EP | 0655824 B1     | 5/1995 |
| KR | 19980017579 U  | 7/1998 |
| WO | 2004055956 A2  | 7/2004 |

* cited by examiner

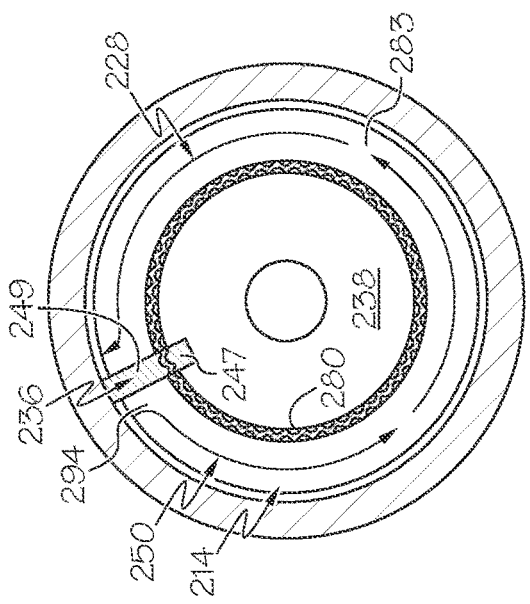
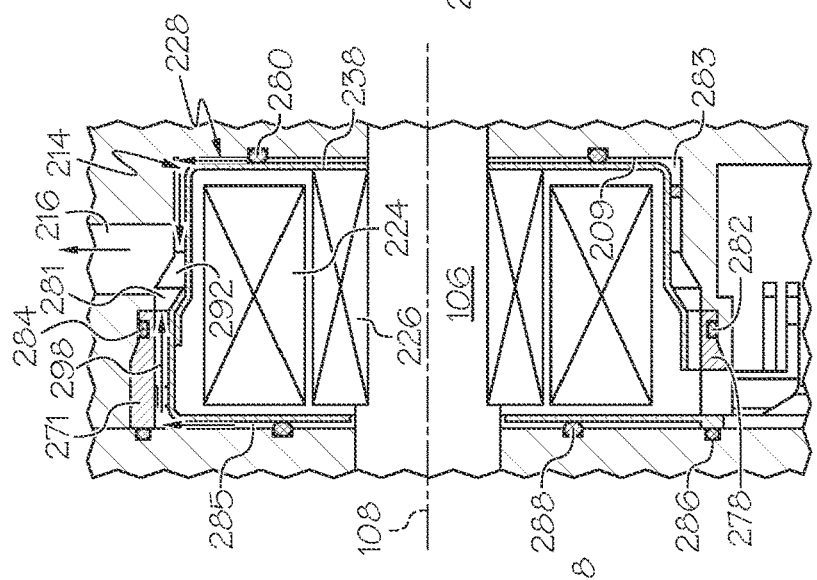
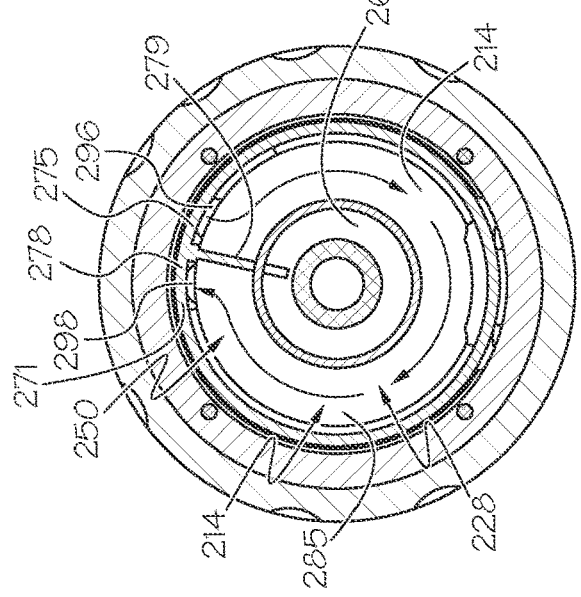
FIG. 8
FIG. 7
FIG. 6

MOTOR COOLING SYSTEM FOR E-BOOSTING DEVICE

TECHNICAL FIELD

The present disclosure generally relates to an e-boosting device and, more particularly, relates to a motor cooling system for an e-boosting device.

BACKGROUND

Charging devices, such as turbochargers or superchargers, are provided that boost performance by compressing a fluid that is then fed to a fuel cell stack, an engine, etc. In some cases, an e-boosting device is provided that has an electric motor configured to drive and rotate a compressor wheel for compressing an airflow, which is then fed to the fuel cell stack, the engine, etc.

These charging devices may include a cooling system. In the case of an e-boosting device, for example, a cooling system may be provided that directs flow of a coolant through the device to maintain operating temperatures within a predetermined range. The electric motor may be cooled, for example, to improve operating efficiency of the motor.

However, conventional cooling systems for e-boosting devices suffer from various deficiencies, and operating efficiency may be negatively affected as a result. It may be difficult to provide an acceptable cooling effect for some charging devices and/or under certain operating conditions. There may be space constraints that limit the size and/or routing of the cooling circuit, which can negatively affect cooling performance.

Thus, it is desirable to provide a cooling system for an e-boosting device that improves the cooling effect and/or operating efficiency. It is also desirable to provide an e-charger cooling system that is compact, highly manufacturable, and that is cost effective. Other desirable features and characteristics of the present disclosure will become apparent from the subsequent detailed description and the appended claims, taken in conjunction with the accompanying drawings and this background discussion.

BRIEF SUMMARY

In one embodiment, a motor case for an electric motor of an e-boosting device is disclosed. The electric motor is configured to drivingly rotate a rotor of the e-boosting device in rotation about an axis. The motor case is configured to be received within an outer housing to cooperatively define a coolant jacket. The motor case includes a shell member that at least partly defines a motor cavity for receiving the electric motor. The motor case also includes a dam member that is fixed to the shell member. The dam member projects from the shell member in an outboard direction from an outer surface of the shell member. The shell member and the dam member are configured to be received within the outer housing to define the coolant jacket and with the dam member partitioning the coolant jacket. The dam member is made of a different material from the shell member.

In a further embodiment, a motor case for an electric motor of an e-boosting device is disclosed. The electric motor is configured to drivingly rotate a rotor of the e-boosting device in rotation about an axis. The motor case is configured to be received within an outer housing to cooperatively define a coolant jacket. The motor case includes a shell member that is metallic and formed to define at least part of a motor cavity for receiving the electric motor. The motor case further includes a dam member that is fixed to the shell member. The dam member is molded onto an outer surface of the shell member to be layered on and attached to the outer surface. The dam member projects from the outer surface in an outboard direction. The dam member is made from a material different from the shell member. The shell member and the dam member are configured to be received within the outer housing to define the coolant jacket and with the dam member partitioning the coolant jacket.

In another embodiment, a method of manufacturing a motor case for an electric motor of an e-boosting device is disclosed. The electric motor is configured to drivingly rotate a rotor of the e-boosting device in rotation about an axis. The motor case is configured to be received within an outer housing to cooperatively define a coolant jacket. The method includes metalforming a shell member that is metallic to form at least part of a motor cavity for receiving the electric motor. The method also includes molding a dam member onto an outer surface of the shell member to be layered on and attached to the outer surface. The dam member projects from the outer surface in an outboard direction. The shell member and the dam member are configured to be received within the outer housing to define the coolant jacket and with the dam member partitioning the coolant jacket.

BRIEF DESCRIPTION OF THE DRAWINGS

The present disclosure will hereinafter be described in conjunction with the following drawing figures, wherein like numerals denote like elements, and wherein:

FIG. 6 is a first end view of a cooling system, which is partly defined by the motor case of FIG. 3;

FIG. 7 is a cross-sectional view of the cooling system of FIG. 6;

FIG. 8 is a second end view of the cooling system of FIG. 6;

DETAILED DESCRIPTION

Figure 1:
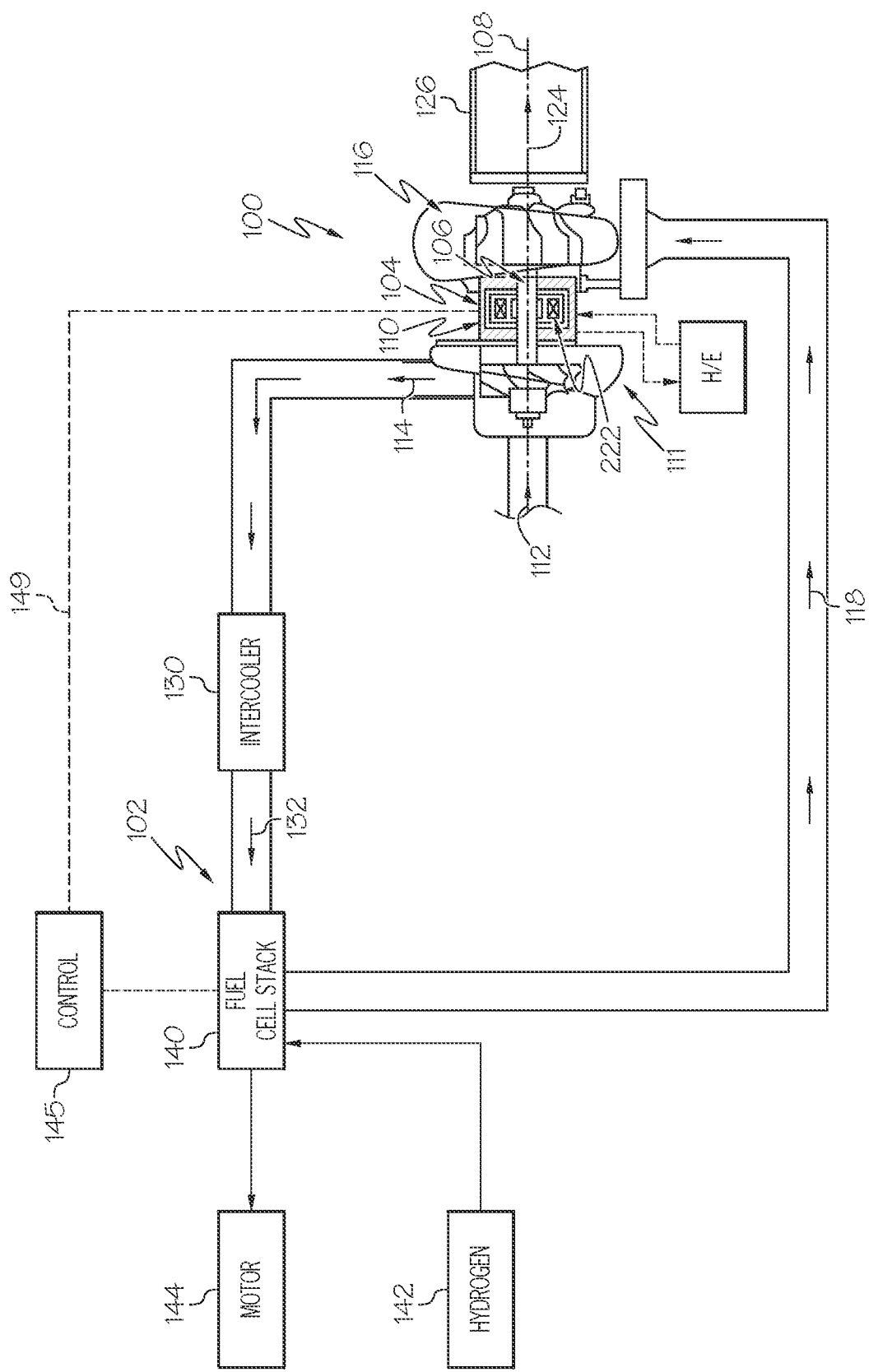
FIG. 1 is a schematic illustration of an e-boosting device incorporated, for example, in a fuel cell system.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved e-boosting device. The disclosed e-boosting device may be a device with an electrically driven compressor wheel that provides a compressed airstream to a downstream component (e.g., an engine, a fuel cell stack, etc.). Also, the e-boosting device of the present disclosure may be configured as an electrically assisted turbocharger, an electric supercharger, as a hybrid turbocharger, as an e-charger assembly, e-turbo, e-assist charging device, or other related component. In particular, an e-boosting device and methods of manufacturing the same are disclosed, wherein the e-boosting device also includes a fluid cooling system through which a coolant (e.g., ethylene glycol) flows for removing heat from the e-boosting device.

The e-boosting device may include a motor case, which encases an electric motor and holds core windings together. At least part of the motor case may be heat conductive for transferring heat from the motor to the coolant. The motor case may have relatively thin wall thickness (especially compared with conventional motor cases) such that mass is reduced, material costs are reduced, and such that heat is transferred quickly and efficiently therethrough to the coolant. The motor case is also chemically resistant to the coolant. The motor case may also define one or more fluid boundaries, barriers, partitions, etc. for the coolant flowing through the cooling system. These boundary members (e.g., dams) can be compact, can be manufactured efficiently, and/or can provide other advantages.

In some embodiments, the motor case may include at least one casing member that includes a shell portion and a dam member that is fixed to an outer surface of the shell portion. The shell portion and the dam member may be made out of different materials.

The shell portion may be formed of and/or may include a metallic material (e.g., aluminum alloy, copper alloy, zinc alloy, magnesium alloy, etc.). Also, the shell portion may be formed via a metalworking or metalforming process. More specifically, the shell portion may be formed from a metal blank or workpiece (e.g., a sheet metal piece) that is plastically deformed via cold work or hot work. The shell portion may be formed via a stamping process, deep drawing, hydroforming, magnetic pulse forming, ultrasonic forming, or other forming method. In these embodiments, the blank may be plastically deformed to include the various contours, edges, surfaces, and other features of the shell portion.

The dam member may be formed of and/or may include a polymeric material. The dam member may be fixed to the shell portion and may project in an outboard direction from the outer surface of the shell portion. In some embodiments, the dam member may be overmolded on the shell portion by a selected plastic injection molding technology (e.g. insert molding).

There may be a plurality of casing members that cooperatively define the motor case and that cooperatively encapsulate the motor. In some embodiments, there may be a first casing member and a second casing member, each including a respective shell member (e.g., a metallic shell member) and a respective dam member (e.g., a polymeric dam member). Once formed, the casing members may be assembled to encapsulate the motor, and the motor case may be leakage tested.

The motor case may encapsulate the motor with a rotor shaft extending outward therefrom. Also, the motor case may be positioned within an outer housing of the e-boosting device. The outer surface of the shell member may oppose the inner surface of the outer housing and may be spaced apart therefrom. Also, the dam member may oppose the inner surface of the outer housing and may be disposed proximate thereto. Accordingly, a coolant jacket may be defined between the motor case and the outer housing. The interface between the dam member and the outer housing may partition the coolant jacket, separate one area of the coolant jacket from another, dam the coolant, and/or direct the flow of coolant through the coolant jacket. Accordingly, the coolant may flow from an inlet, into and through the coolant jacket, and to an outlet to remove heat (e.g., from the stator of the motor, from the housing, from the casing, from one or more bearing components, or from other areas proximate the coolant jacket).

In some embodiments, there may be one or more sealing members that form a seal between the motor case and the outer housing. In some embodiments, one or more dam members may be formed to include a feature (e.g., a groove) that receives the sealing member. As such, the dam member can be formed simply and effectively for securing the sealing member in place.

Furthermore, in some embodiments, the dam members may be formed to include or at least partly define a gap, aperture, hole, or other void. This gap, etc. may define a fluid passage for the coolant to flow from one area of the coolant jacket to another. In other words, the gap may fluidly connect these areas of the coolant jacket. In some embodiments, the dam member may include a first portion that is attached and overlaid on the shell member and a second portion that is detached and spaced apart from the outer surface of the shell member to define the gap, aperture, void, etc.

Accordingly, the coolant jacket may be highly detailed with a tortuous fluid pathway in some embodiments. The coolant may be directed about the motor case for effectively removing heat from the e-boosting device. Several cooling passages may be defined with a predetermined shape, size, and flow profile in order to provide the desired flow of the coolant. Additionally, manufacturing methods of the present disclosure can be employed for forming the motor case efficiently, accurately, and repeatably in a high-volume manufacturing environment.

FIG. 1 is a schematic view of an example e-boosting device 100 according to example embodiments of the present disclosure. In some embodiments, the e-boosting device 100 may be incorporated within a fuel cell system 102 of a vehicle.

Generally, the e-boosting device 100 may include an e-charger housing 104 and a rotor 106 (i.e., a rotating group). The rotor 106 may be supported for rotation by one or more bearings within the e-charger housing 104 about an axis of rotor rotation 108.

The e-boosting device 100 may include a motor section 110. The motor section 110 may include an electric motor 222 that selectively drives the rotor 106 in rotation about the axis 108.

The e-boosting device 100 may also include a compressor section 111 with a compressor wheel that is fixed to the rotor 106 and that rotates within the housing 104 (within a compressor housing member). As a result of rotation of the rotor 106, the compressor section 111 of the e-boosting device 100 may compress a received input air stream 112 into a pressurized air stream 114. This pressurized air stream 114 may be directed to the fuel cell system 102.

The e-boosting device 100 may also include a turbine section 116. The turbine section 116 may include a turbine wheel that is fixed an end of the rotor 106 that is opposite the compressor section 111, and this turbine wheel may rotate within the housing 104 (within a turbine housing member). The turbine section 116 may be configured to receive a high-pressure and high-temperature exhaust gas stream 118 from the fuel cell system 102.

The turbine section 116 may transfer and/or convert energy of the exhaust gas stream 118. For example, the turbine section 116 may drive the rotor 106 to drive rotation of the compressor section 111. In additional embodiments, the turbine section 116 may be operatively connected to an electric generator for generating electrical energy for the motor section 110. The high-pressure exhaust gas stream 118 may become a lower-pressure exhaust gas stream 124 that is released into a downstream exhaust pipe 126.

From the compressor section 111, the pressurized air stream 114 may be characterized by an increased temperature, over that of the input air stream 112. Accordingly, the air stream 114 may be channeled through an air cooler 130 (i.e., an intercooler), such as a convectively cooled charge air cooler. The air cooler 130 may be configured to dissipate heat from the air stream 114, increasing its density. The resulting cooled and pressurized air stream 132 may be channeled to a fuel cell stack 140, or alternatively, into a subsequent-stage, in-series compressor.

Hydrogen may be supplied to the fuel cell stack 140 from a tank 142, and oxygen may be supplied to the fuel cell stack 140 to generate electricity by a known chemical reaction. The fuel cell stack 140 may generate electricity for an electrical device, such as an electric motor 144.

A control system 145 may be included for controlling the various systems. The control system 145 may be connected to one or more components via communication connection (s) 149. The control system 145 may be a computerized system with a processor, various sensors, and other components for electrically controlling operation of the motor 144, the fuel cell stack 140, and/or the e-boosting device 100. Also, the fuel cell system 102 may be included in a vehicle, such as a car, truck, sport utility vehicle, van, motorcycle, etc. Therefore, in some embodiments, the electric motor 144 may convert the electrical power to mechanical power to drive and rotate an axle (and, thus, one or more wheels) of the vehicle. In these embodiments, the control system 145 may be incorporated within a vehicle control unit, which controls a number of additional vehicle systems (e.g., braking systems, air-conditioning systems, etc.).

Thus, during operations, oxygen may be provided to the fuel cell stack 140, at least in part, by the e-boosting device 100 as represented in FIG. 1. More specifically, the motor section 110 may drive rotation of the rotor 106, and the compressor section 111 may provide the pressurized air stream 114 to the air cooler 130 as it flows to the stack 140, and the exhaust gas stream 118 from the stack 140 may be fed back to the turbine section 116 for providing power assist to the motor section 110. It will be appreciated, however, that other embodiments of the e-boosting device 100 fall within the scope of the present disclosure. For example, in some embodiments, the turbine section 116 may be omitted such that the e-boosting device 100 includes the motor section 110 as well as the compressor section 111. Additionally, in some embodiments, the e-boosting device 100 may include a plurality of sections, such as a plurality of compressor sections that are fluidly connected in succession to include a first (low pressure) stage that feeds a second (high pressure) stage that ultimately feeds the fuel cell system 102. Moreover, the e-boosting device 100 may be provided in systems other than the fuel cell system 102 without departing from the scope of the present disclosure.

It will be appreciated that the term "e-boosting device" as used herein is to be interpreted broadly, for example, to include devices with an electrically driven compressor wheel regardless of where the e-boosting device is incorporated, the type of system in which the e-boosting device is incorporated, etc. It will also be appreciated that the e-boosting device of the present disclosure may also be referred to as an electrically driven compressor assembly. Also, the e-boosting device of the present disclosure may be configured as an electric supercharger, as a hybrid turbocharger, as an e-charger device, e-turbo, or other related component.

Figure 2:
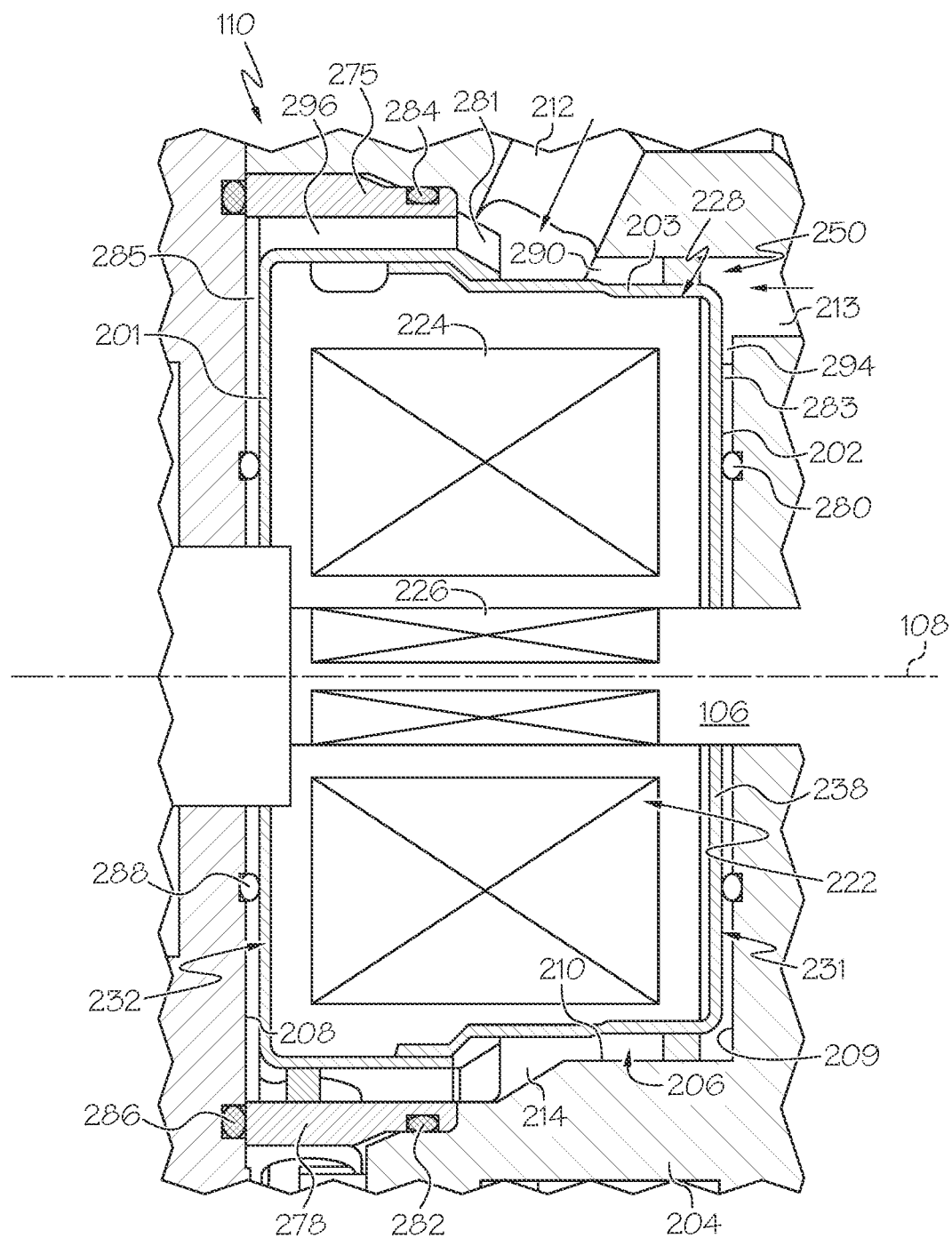
FIG. 2 is a cross-sectional view of a motor section of the e-boosting device according to example embodiments of the present disclosure.

Referring now to FIG. 2, the motor section 110 is shown in greater detail according to example embodiments. The motor section 110 may include the motor 222 as mentioned above. The motor 222 may include a stator 224 and a rotor member 226. The rotor member 226 may be fixed to the shaft of the rotor 106, and the rotor member 226 may be received within the stator 224 and may be operatively connected such that the rotor 106 is selectively driven in rotation by the motor 222.

Figure 4:
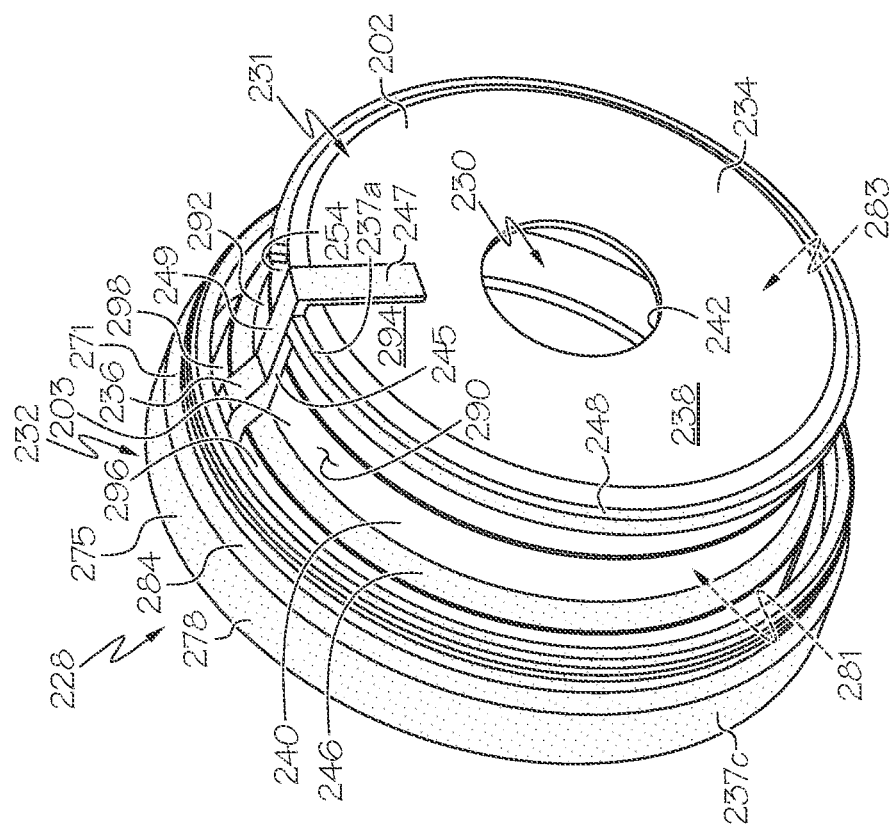
FIG. 4 is a second isometric view of the motor case of FIG. 2.
Figure 3:
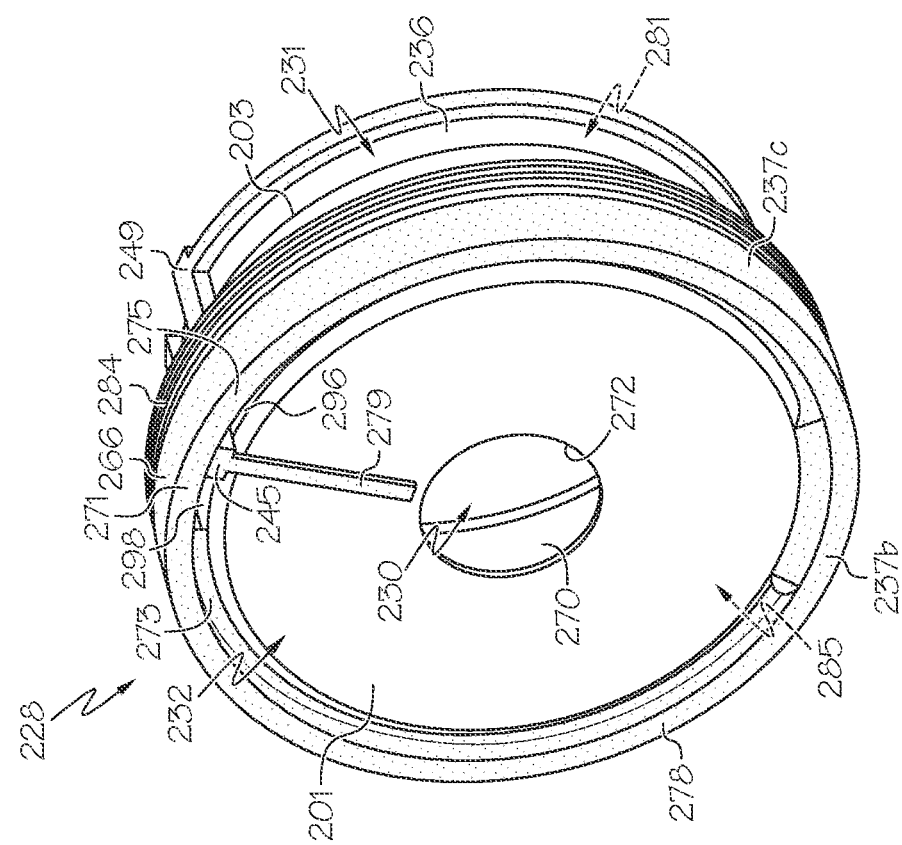
FIG. 3 is a first isometric view of a motor case of the motor section of FIG. 2 according to example embodiments of the present disclosure.

The motor 222 may be encased within a motor case 228 (FIGS. 2, 3, and 4). Generally, the motor case 228 may be a hollow, shell-like, thin-walled body. Thus, the motor case 228 may include an interior motor cavity 230 therein. The size and dimensions of the motor cavity 230 may correspond to that of the motor 222 to be nested and supported therein. The shaft of the rotor 106 may extend and project out from opposite sides of the motor case 228. Otherwise, the motor case 228 may substantially house, encapsulate, and support the motor 222.

Generally, the motor case 228 may be cylindrical and/or or barrel-shaped. The motor case 228 may include a first end 201 and a second end 202 that extend transverse to the axis 108 and that are spaced apart from each other along the axis 108. The motor case 228 may further include a side 203 that extends about the axis 108 in a circumferential direction. The side 203 may also extend longitudinally between the first end 201 and the second end 202.

For reference purposes, an "outboard direction" will be discussed relative to the motor case 228. For example, in the illustrated embodiments, the outboard direction can be directed longitudinally (i.e., substantially parallel to the axis) away from the first end 201 and away from the motor cavity 230. Furthermore, the outboard direction can be directed longitudinally (i.e., substantially parallel to the axis) away from the second end 202 and away from the motor cavity 230. Furthermore, the outboard direction can be directed radially away from the side 203 of the motor case 228.

Conversely, the motor case 228 may define an inboard direction that is directed toward the motor case 228 and the motor cavity 230 therein. The inboard direction is directed longitudinally into the motor cavity 230. Furthermore, the inboard direction is directed radially toward the side 203 of the motor case 228 and into the motor cavity 230.

As shown in FIG. 2, the motor case 228 may be received and fixedly supported within an outer housing 204. The outer housing 204 may define part of the housing 104 of the e-boosting device 100. The outer housing 204 may include one or more strong and robust (e.g., metallic) parts. The outer housing 204 may be block-like with an outer housing cavity 206 that is substantially cylindrical or barrel-shaped. As shown in FIG. 2, the outer housing cavity 206 may be defined by a first face 208, a second face 209, and a side face 210. The motor case 228 may be received within the outer housing cavity 206 such that the first end 201 opposes the first face 208, the second end 202 opposes the second face 209, and the side 203 opposes the side face 210.

Furthermore, the e-boosting device 100 may include a cooling system 250 (FIGS. 2 and 6-8). The cooling system

250 may include a plurality of fluid channels, reservoirs, passages, circuits, etc. that receive one or more flows of liquid coolant. The cooling system 250 may include at least one inlet, such as a first inlet 212 and a second inlet 213 (FIG. 2). The cooling system 250 may further include a coolant jacket 214. The coolant jacket 214 may be cooperatively defined by the motor case 228 and the outer housing 204 so as to surround the motor case 228. Stated differently, a majority of the exterior of the motor case 228 may be smaller than the interior surface of the outer housing cavity 206. As such, the exterior of the motor case 228 may be spaced away and separated at a distance from the interior surface of the outer housing cavity 206. The space between the exterior of the motor case 228 and the interior surface of the outer housing cavity 206 may define the coolant jacket 214. The cooling system 250 may additionally include at least one outlet 216 (FIG. 7). In some embodiments, liquid coolant may be provided via the inlets 212, 213 to the coolant jacket 214, and this coolant may be discharged via the outlet 216. As the coolant flows through the cooling system 250, the coolant may remove heat from the e-boosting device 100 to maintain high operating efficiency.

Figure 5:
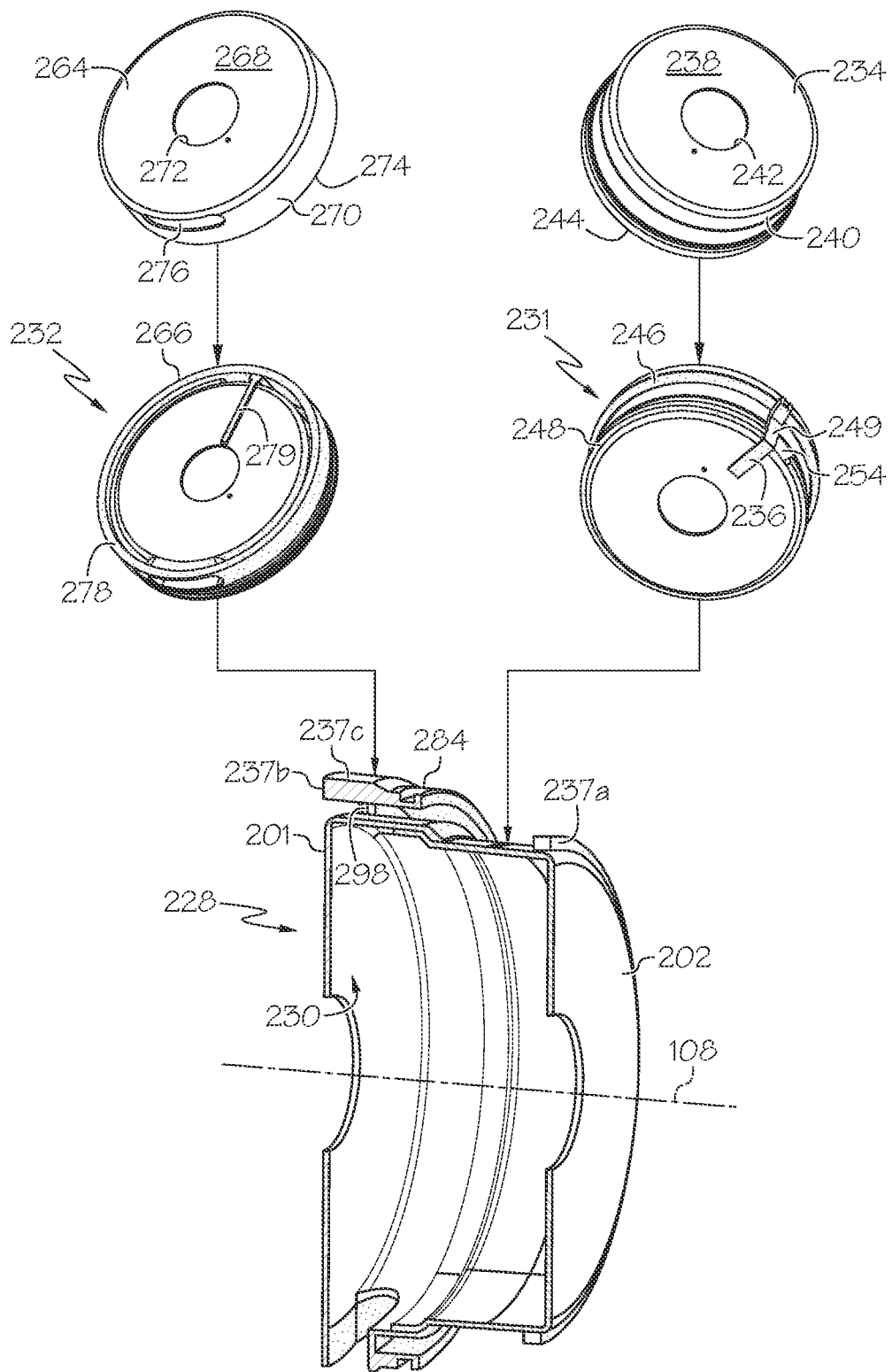
FIG. 5 is an exploded view of the motor case of FIGS. 3 and 4.

Referring now to FIGS. 3-5, the motor case 228 will be discussed in detail according to example embodiments. In some embodiments, the motor case 228 may include a plurality of pieces, parts, members, etc. that cooperatively define the motor case 228 and the motor cavity 230 therein. For example, the motor case 228 may generally include a first casing member 231 and a second casing member 232, which are fixed together (e.g., removably attached) end-to-end so as to cooperatively define the motor case 228 and the motor cavity 230 therein. The first casing member 231 may be referred to as a "sleeve" and the second casing member 232 may be referred to as a "cap" for the motor 222 in some embodiments.

The first casing member 231 may include a first shell member 234. As shown in FIG. 5, the first shell member 234 may be unitary, cup-shaped, and thin-walled (e.g., as low as one millimeter wall thickness). This reduced wall thickness may increase heat transfer away from the motor 222. The first shell member 234 may include a circular and plate-like end disc 238 (FIG. 5) and an annular ring 240 fixed thereto. The annular ring 240 may include one or more features (e.g., tapered sections, shoulders, edges, or other surface features) that vary the diameter of the annular ring 240 as it projects from the disc 238. The end disc 238 may include a central aperture 242. The ring 240 may project from one side of the end disc 238 and terminate at a rim 244. The rim 244 may have a slightly larger diameter than the end disc 238.

The first shell member 234 may be a formed metal piece. As such, the first shell member 234 may be a plastically deformed part and a metalworked part. The first shell member 234 may be formed via a cold working process or via a hot working process. This metalworking can be used to efficiently and repeatedly formed the cup-like shape of the first shell member 234.

Also, the first casing member 231 may include at least one first dam member 236. The first dam member(s) 236 may be fixed to the first shell member 234. The first dam member(s) 236 may be layered on and fixed to an outer surface of the first shell member 234. The first dam member(s) 236 may also project in the outboard direction from the outer surface of the first shell member 234. Thus, the first dam member(s) 236 may be referred to as "projecting portions" or "outboard parts" that project from the shell member(s) 234 in the outboard direction. The first dam members 236 may project from the first shell member 234 in the outboard direction and have a number of smooth outer surfaces, such as a first outer surface 237*a*. The first outer surface 237*a* may be smooth and annular and may face longitudinally and in an outboard direction away from the motor case 228. The surface 237*a* may define part of the second end 202 of the motor case 228.

The first dam members 236 may include a first circumferential dam 246, which is elongate and layered on the outer surface of the first shell member 234. The first circumferential dam 246 may extend in the circumferential direction on the first shell member 234. The first circumferential dam 246 may be disposed proximate the rim 244. The first dam members 236 may also include a second circumferential dam 248. The second circumferential dam 248 may be elongate, layered on the outer surface of the first shell member 234, and may extend in the circumferential direction. The second circumferential dam 248 may be disposed proximate the transition between the rim 244 and the end disc 238. Furthermore, the first dam members 236 may include an elongate dam 249. The elongate dam 249 may include a plurality of elongate and straight segments, such as a first segment 245 that extends longitudinally along the annular ring 240, and a second segment 247 that extends radially along the end disc 238. As shown in FIGS. 4 and 5, there may be a space 254 defined circumferentially between the elongate dam 249 and a terminal end of the second circumferential dam 248.

In some embodiments, the first shell member 234 and the first dam members 236 may be made from different materials. For example, in some embodiments, the first shell member 234 may be made from a metallic material, whereas the first dam members 236 may be made from a polymeric material. However, it will be appreciated that, in other embodiments, the first shell member 234 and dam members 236 may be made from different metallic materials. In further embodiments, the first shell member 234 and dam members 236 may be made from different polymeric materials. In some embodiments, the first dam members 236 may be overmolded, polymeric members that are molded to the outer surface of the first shell member 234.

The second casing member 232 may include a second shell member 264. As shown in FIG. 5, the second shell member 264 may be unitary, cup-shaped, and thin-walled (e.g., as low as one millimeter wall thickness). This reduced wall thickness may increase heat transfer away from the motor 222. The second shell member 264 may include a circular and plate-like end disc 268 (FIG. 5) and an annular ring 270 fixed thereto. The annular ring 270 may have a substantially constant diameter. The end disc 268 may include a central aperture 272. The ring 270 may project from one side of the end disc 268 and terminate at a rim 274. The ring 270 may also include an elongate side opening 276 extending therethrough.

The second shell member 264 may be a formed metal piece. As such, the second shell member 264 may be a plastically deformed part and a metalworked part. The second shell member 264 may be formed via a cold working process or via a hot working process. This metalworking can be used to efficiently and repeatedly formed the cup-like shape of the second shell member 264.

Also, the second casing member 232 may include at least one second dam member 266. The second dam member(s) 266 may be fixed to the second shell member 264. The second dam member(s) 266 may be fixed to an outer surface of the second shell member 264. The second dam member(s) 266 may also project in the outboard direction from the outer surface of the second shell member 264. Thus, the second dam member(s) 266 may be referred to as "projecting portions" or "outboard parts" that project from the shell member(s) 264 in the outboard direction. The second dam members 266 may project from the second shell member 264 in the outboard direction and have a number of smooth outer surfaces, such as a second outer surface 237b and a third outer surface 237c. The second outer surface 237b may be smooth and annular and may face longitudinally and in an outboard direction, away from the motor case 228 to define part of the first end 201. The third outer surface 237c may be smooth and annular and may face radially and in an outboard direction, away from the motor case 228 and the axis 108.

The second dam members 266 may include an outer skirt 278, which may be elongate and annular, extending about the ring 270. The second dam members 266 may further include an end dam 279, which is elongate and linear, and which extends radially along the end disc 268.

In some embodiments, the second shell member 264 and the second dam members 266 may be made from different materials. For example, in some embodiments, the second shell member 264 may be made from a metallic material, whereas the second dam members 266 may be made from a polymeric material. However, it will be appreciated that, in other embodiments, the second shell member 264 and dam members 266 may be made from different metallic materials. In further embodiments, the second shell member 264 and dam members 266 may be made from different polymeric materials. In some embodiments, the second dam members 266 may be overmolded, polymeric members that are molded to the outer surface of the second shell member 264.

At least one of the first and second casing members 231, 232 may be formed according to embodiments of manufacturing methods of the present disclosure. For example, both may be formed using a combination of metalforming and overmolding processes. In some embodiments, the first casing member 231 may be formed by metalforming (e.g., cold working via stamping, pressing, or other similar process) the first shell member 234. Then, the first dam members 236 may be overmolded onto the first shell member 234. Furthermore, the second casing member 232 may be formed similarly, by metalforming the second shell member 264 and subsequently overmolding the second dam member 266 onto the second shell member 264. The skirt 278 may be overmolded to include an opening that aligns with the side opening 276. The casing members 231, 232 may also be heat treated, coated, or otherwise treated before further assembly.

The first and second casing members 231, 232 may be joined and, in some embodiments, removably attached (FIGS. 3-5). As shown in FIG. 5, the first casing member 231 may be received in the second casing member 232. The rim 244 of the first casing member 231 may be received within the rim 274 of the second casing member 232. The outer radial surface of the rim 244 may be fluidly sealed to the inner radial surface of the rim 274. Thus, the annular rings 240, 270, the skirt 278, and the first and second circumferential dams 246, 248 may extend about the axis 108 and may define the side 203 of the motor case 228. Also, the end disc 268 and the end dam 279 may extend radially with respect to the axis 108 and may define the first end 201 of the motor case 228. Furthermore, the end disc 238 and the elongate dam 249 may define the second end 202 of the motor case 228. The first and second casing members 231, 232 may be joined and sealed using adhesives, fasteners, an interference fit, or otherwise.

The motor case 228 may further include and define at least one through-hole, such as a first through-hole 296 (FIGS. 2-4 and 6) and a second through-hole 298 (FIGS. 3-7). The through-holes 296, 298 may have any suitable shape and may be referred to as gaps, apertures, or other types of openings that allow the coolant to pass therethrough for flow between one part of the coolant jacket 214 to another. The through-holes 296, 298 may be defined independently to have a continuous fluid boundary extending through the motor case 228. Thus, while some of the coolant jacket 214 may be cooperatively defined by the motor case 228 and the outer housing 204, the through-holes 296, 298 may be define part of the coolant jacket 214 independently from the outer housing 204.

In some embodiments represented in FIG. 3, the skirt 278 may include an attached area 273 that is layered on and attached to the outer surface of the annular ring 270. The skirt 278 also projects outwardly in the radial direction from the attached area 273 and may extend about the ring 270. The skirt 278 may also include a first detached area 275 and a second detached area 271 that are detached from the ring 270. The outer surfaces of the detached area 271, 275 and attached areas 273 of the skirt 278 may be flush as shown in FIGS. 3 and 4 so as to be smooth, continuous, and annular.

The first detached area 275 may extend from one circumferential end of the attached area 273 to the first segment 245 of the elongate dam 249. The first detached area 275 may also be spaced apart in the outboard direction (i.e., the radial direction) from the outer surface of the shell member 264 to define the first through-hole 296 therebetween in the radial direction. As such, the first through-hole 296 may extend longitudinally (e.g., substantially parallel to the axis 108) through the motor case 228, between the shell member 264 and the skirt 278. Also, the first through-hole 296 may be arcuately shaped so as to extend circumferentially with respect to the axis 108.

The second detached area 271 may extend from the opposite circumferential end of the attached area 273 to the first segment 245 of the elongate dam 249. The second detached area 271 may be spaced apart in the outboard direction (i.e., the radial direction) from the outer surface of the shell member 264 to define the second through-hole 298 therebetween in the radial direction. As such, the second through-hole 298 may extend longitudinally (e.g., substantially parallel to the axis 108) through the motor case 228, between the shell member 264 and the skirt 278. Also, the second through-hole 298 may be arcuately shaped so as to extend circumferentially with respect to the axis 108.

Once the first and second casing members 231, 232 are formed, they may be joined together to encase the electric motor 222. Then, as shown in FIGS. 2 and 6-8, the motor case 228 may be provided in the outer housing 204. The motor case 228 may be nested therein with outer surfaces of the first and second dam members 236, 266 (FIGS. 3, 5, and 9) lying adjacent the opposing inner faces 208, 209, 210 of the outer housing cavity 206. For example, the smooth first, second, and third surfaces 237a, 237b, 237c (FIGS. 3-5) may lie proximate correspondingly smooth portions of the inner faces 208, 209, 210. When positioned therein, the outer surfaces of the first and second shell members 234, 264 may be spaced apart at a distance from the opposing inner faces 208, 209, 210 of the outer housing cavity 206.

Accordingly, as shown in FIGS. 2 and 6-8, the coolant jacket 214 may be at least partly defined by the space between the outer surface of the shell members 234, 264 and the inner faces 208, 209, 210 of the outer housing cavity 206. Fluid from the inlets 212, 213 (FIG. 2) can flow through this space to the outlet 216 (FIG. 7). The first and second dam members 236, 266 may partition the coolant jacket 214 such that coolant is directed to low primarily along a predetermined path through the coolant jacket 214.

Furthermore, the assembly 100 may include one or more sealing members. The sealing members may be independent parts that are sealed to the motor case 228 and/or to the outer housing 204. The sealing members may, thus, define sealed fluid boundaries and further partition the coolant jacket 214. For example, the assembly 100 may include a first sealing member 280 (FIGS. 2, 7, and 8). The first sealing member 280 may be a polymeric O-ring that is centered on the axis 108, and which may be disposed between and sealed to the end disc 238 and the face 209. As shown in FIG. 7, the face 209 may include a groove that receives the first sealing member 280. The assembly 100 may additionally include a second sealing member 282. The second sealing member 282 may be a polymeric O-ring that is centered on the axis 108, and which may be disposed between and sealed to the outer radial surface of the skirt 278 and the side face 210. As shown in FIGS. 2 and 7, the outer skirt 278 may include a groove 284 that receives the second sealing member 282. The groove 284 may be formed by the molding process discussed above. Furthermore, the assembly 100 may additionally include a third sealing member 286. The third sealing member 286 may be a polymeric O-ring that is centered on the axis 108, and which may be disposed between and sealed to the end surface of the skirt 278 and the face 208 of the outer housing 204. As shown in FIGS. 2 and 7, the face 208 may include a groove that receives the third sealing member 286. Also, the assembly 100 may additionally include a fourth sealing member 288 (FIGS. 2 and 7). The fourth sealing member 288 may be a polymeric O-ring that is centered on the axis 108, and which may be disposed between and sealed to the end disc 268 and the face 208. As shown in FIG. 7, the face 208 may include a groove that receives the fourth sealing member 288.

Thus, one or more continuous fluid pathways may be defined through the coolant jacket 214 from the inlets 212, 213 to the outlet 216. As illustrated, there may be a plurality of pathways that flow in-parallel through the coolant jacket 214 as will be discussed.

Specifically, a first coolant flow path (i.e., a circumferential flow path) may be defined. Coolant from the inlet 212 (FIG. 2) may be provided to a first inlet area 290 (FIGS. 2 and 4) and then to a side chamber 281 of the coolant jacket 214. The side chamber 281 may surround the side 203 of the motor case 228. The side chamber 281 may be collectively defined by the first circumferential dam 246, the skirt 278, the elongate dam 249, the outer surface of the first shell member 234, and the face 210 of the outer housing 204. Fluid in the side chamber 281 may flow circumferentially about the motor case 228 to an outlet area 292 on the opposite side of the elongate dam 249 (FIGS. 4 and 7). This outlet area 292 may be fluidly connected to the outlet 216 (FIG. 7) for discharging this coolant.

Also, a second coolant flow path (i.e., a first end flow path) may be defined. Coolant from the inlet 213 (FIG. 2) may be provided to a second inlet area 294 and then to a first end chamber 283 of the coolant jacket 214. The first end chamber 283 may surround the end 202 of the motor case 228. The first end chamber 283 may be collectively defined by the second circumferential dam 248, the second segment 247 of the elongate dam 249, the first sealing member 280, the end disc 238, and the face 209. Fluid in the first end chamber 283 may flow circumferentially about the motor case 228 to the space 254 (FIG. 4) and, then, to the outlet area 292 for coolant discharge.

Furthermore, a third coolant flow path (i.e., a second end flow path) may be defined. The first through-hole 296 of the motor case 228 may fluidly connect the side chamber 281 to a second end chamber 285 of the coolant jacket 214. The second end chamber 285 may surround the end 201 of the motor case 228. The second end chamber 285 may be collectively defined by the skirt 278, the sealing member 288, the outer surface of the end disc 268, and the face 208 of the second shell member 264. In this coolant flow path, coolant that is inlet via the first inlet 212 may flow through the first through-hole 296 and into the second end chamber 285. This fluid may flow circumferentially about the end disc 268 toward the second through-hole 298. The second through-hole 298 may fluidly connect and outlet the second end chamber 285 to the outlet area 292 of the side chamber 281 of the coolant jacket 214 to discharge via the outlet 216.

The through-holes 296, 298 through the motor case 228 provide useful routing of the coolant through the coolant jacket 214. The through-holes 296, 298 may be formed easily for routing the coolant. Various through-hole configurations may be included in additional embodiments as well. Through-holes may extend radially in some embodiments, at an angle relative to the axis 108, or along a nonlinear axis.

Figure 9:
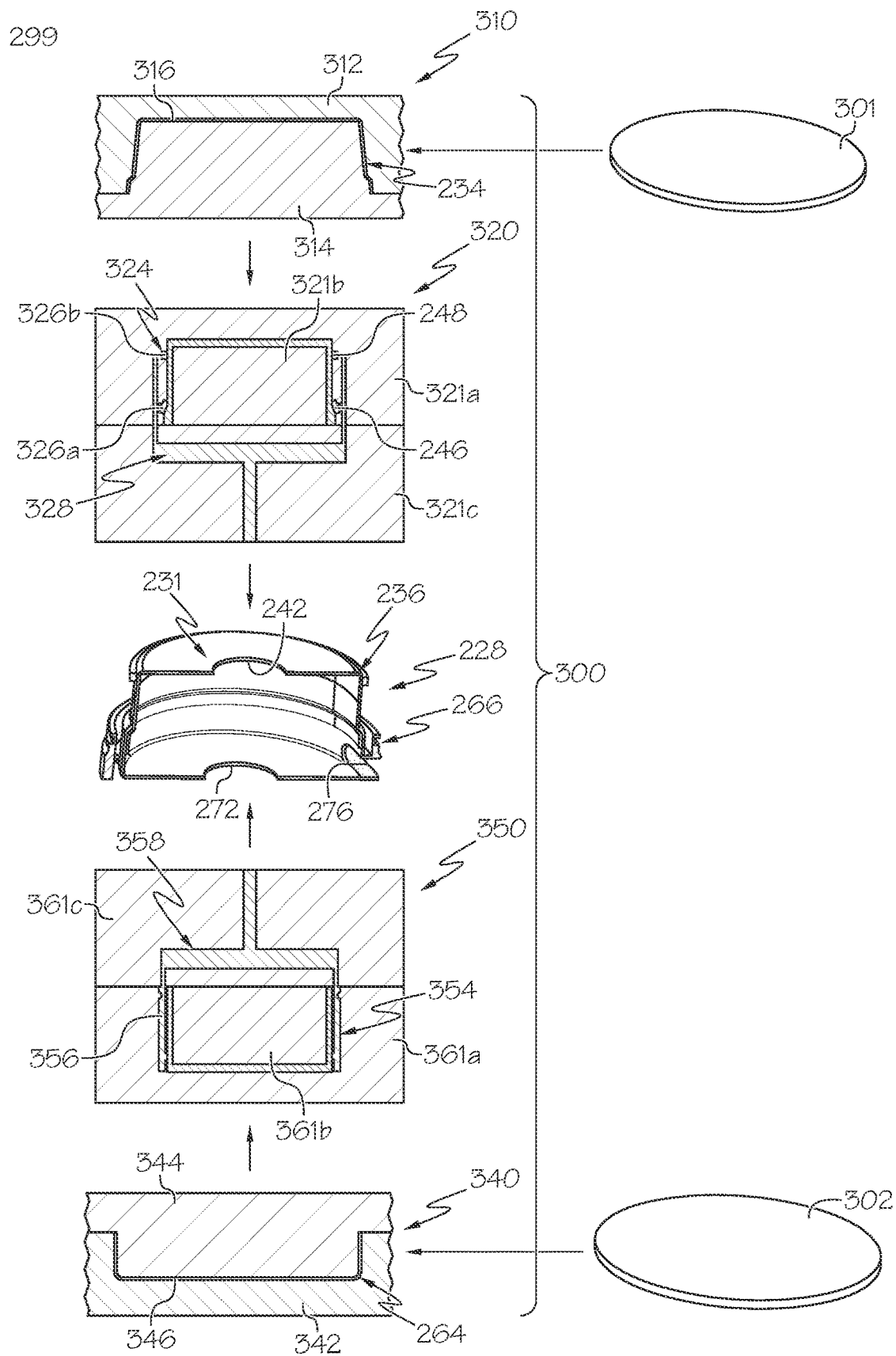
FIG. 9 is a schematic illustration of a method of manufacturing the motor case of FIGS. 3-5 according to example embodiments of the present disclosure.

FIG. 9 illustrates a method 299 of manufacturing the motor case 228 according to example embodiments of the present disclosure. The motor case 228 may be formed using a manufacturing system 300, which will be discussed according to example embodiments of the present disclosure.

The method 299 may include formation of the first shell member 234. As shown in FIG. 9, the first shell member 234 may be formed from a first workpiece 301. The first workpiece 301 may be a thin, flat, sheet or plate in some embodiments. The first workpiece 301 may be made of metal in some embodiments. For example, the first workpiece 301 may be a sheet-like piece of aluminum alloy, copper alloy, zinc alloy, magnesium alloy, or other metallic material. This material can be chosen such that the first shell member 234 is strong and robust as well as heat-conductive, chemically resistant and non-magnetic.

The first workpiece 301 may be metalformed and plastically deformed in a first metalworking system 310. As shown, the first metalworking system 310 may include, at least, a first die 312 and a second die 314 that are moveably supported relative to each other. The dies 312, 314 may mate together to cooperatively define a cavity 316 therebetween. The workpiece 301 may be placed between the dies 312, 314, and the dies 312, 314 may be actuated toward each other to be shaped according to the surfaces of the cavity 316. As such, the first metalworking system 310 may plastically deform the first workpiece 301 (e.g., via cold work) to form the first shell member 234. More specifically, the first metalworking system 310 may be stamping system, deep drawing system, hydroforming system, magnetic pulse forming system, ultrasonic forming system, or other forming system. The first shell member 234 may be removed from the cavity 316 for further processing discussed below.

It will be appreciated that the first metalworking station 310 shown in FIG. 9 is a schematic representation of example embodiments. There may be additional embodiments wherein there are successive stations (represented collective at 310) with respective dies or other components for progressively shaping the first shell member 234. For example, in additional embodiments, the first metalworking system 310 may include different stations and respective components for blanking, cupping, drawing, re-drawing, re-striking, piercing (e.g., to form the central aperture 242), and trimming the workpiece 301 to form the first shell member 234. Once formed, the first shell member 234 may additionally be heat treated, coated, cleaned, polished, textured, or otherwise processed before the first dam members 236 are formed thereon.

Next, as shown in FIG. 9, the first dam members 236 may be molded to the first shell member 234. For example, an overmolding system 320 may be utilized for molding the first dam members 236. The overmolding system 320 may include a plurality of interconnecting molds 321*a*, 321*b*, 321*c* and a runner system 328. There may also be vents for air that is displaced when polymeric material is supplied via the runner system 328.

The molds 321*a*, 321*b*, 321*c* may be moveably supported relative to each other and may mate together to cooperatively define at least one cavity 324. The runner system 328 may be fluidly connected to the cavity 324. The first shell member 234 may be provided between the molds 321*a*, 321*b*, 321*c*. At least a portion of the first shell member 234 may nest against one or more of the molds 321*a*, 321*b*, 321*c*, and another portion of the first shell member 234 may be spaced apart from the internal surface of the cavity 324. Accordingly, one or more spaces 326*a*, 326*b* may be defined for receiving a polymeric material for overmolding the first dam members 236 onto the first shell member 234. The runner system 328 may include a plurality of branches for feeding molten polymer to the spaces 326*a*, 326*b*. There may be a first space 326*a* for forming the first circumferential dam 246. There may be a second space 326*b* for forming the second circumferential dam 248. There may be similar spaces for the elongate dam 249.

The polymeric material for forming the first dam members 236 may be chosen to be chemically resistant to the coolant, suitable for overmolding to the first shell member 234, and may be relatively high in heat conductivity. The dam members 236 may be cured within the cavity 324 to thereby form according to the internal surfaces of the cavity 324 and attach to the first shell member 234. Furthermore, there may be internal cooling or heating lines for controlling temperature of the molding system 320. Once formed, there may be additional coatings added or other processing of the first casing member 231 before it is joined to the second casing member 232.

The overmolding system 320 may be configured so as to increase manufacturing efficiency. For example, the runner system 328 may include a plurality of branches for feeding molten polymer to the spaces 326*a*, 326*b* simultaneously. Also, the molds 321*a*, 321*b*, 321*c* may be shaped and configured to allow for accurate and repeatable molding, and also for quick removal of the molded first casing member 231 therefrom. For example, the molds 321*a*, 321*b*, 321*c* may be configured to avoid overhanging one another in the direction that the mold opens. Also, one or more of the molds 321*a*, 321*b*, 321*c* can be a so-called lifter or other part that is designed to move from between such an overhang when the mold opens.

Furthermore, as shown in FIG. 9, the second shell member 264 may be formed from a second workpiece 302. The second workpiece 302 may be a thin, flat, sheet or plate in some embodiments. The second workpiece 302 may be made of metal in some embodiments. For example, the second workpiece 302 may be a sheet-like piece of aluminum alloy, copper alloy, zinc alloy, magnesium alloy, or other metallic material. This material can be chosen such that the second shell member 264 is strong and robust as well as heat-conductive, chemically resistant and non-magnetic.

The second workpiece 302 may be metalformed and plastically deformed in a second metalworking system 340. As shown, the second metalworking system 340 may include, at least, a first die 342 and a second die 344 that are moveably supported relative to each other. The dies 342, 344 may mate together to cooperatively define a cavity 346 therebetween. The workpiece 302 may be placed between the dies 342, 344, and the dies 342, 344 may be actuated toward each other to be shaped according to the surfaces of the cavity 346. As such, the second metalworking system 340 may plastically deform the second workpiece 302 (e.g., via cold work) to form the second shell member 264. More specifically, the first metalworking system 310 may be stamping system, deep drawing system, hydroforming system, magnetic pulse forming system, ultrasonic forming system, or other forming system. The second shell member 264 may be removed from the cavity 346 for further processing discussed below.

It will be appreciated that the second metalworking station 340 shown in FIG. 9 is a schematic representation of example embodiments. There may be additional embodiments wherein there are successive stations (represented collective at 340) with respective dies or other components for progressively shaping the second shell member 264. For example, in additional embodiments, the second metalworking system 340 may include different stations and respective components for blanking, cupping, piercing (e.g., to form the side opening 276 and the central aperture 272) and trimming the workpiece 302 to form the second shell member 264. Once formed, the second shell member 264 may additionally be heat treated, coated, cleaned, polished, textured, or otherwise processed before the second dam members 266 are formed thereon.

Next, as shown in FIG. 9, the second dam members 266 may be molded to the second shell member 264. For example, an overmolding system 350 may be utilized for molding the second dam members 266. The overmolding system 350 may include a plurality of interconnecting molds 361*a*, 361*b*, 361*c* and a runner system 358. There may also be vents for air that is displaced when polymeric material is supplied via the runner system 358.

The molds 361*a*, 361*b*, 361*c* may be moveably supported relative to each other and may mate together to cooperatively define at least one cavity 354. The runner system 358 may be fluidly connected to the cavity 354. The second shell member 264 may be provided between the molds 361*a*, 361*b*, 361*c*. At least a portion of the second shell member 264 may nest against one or more of the molds 361*a*, 361*b*, 361*c*, and another portion of the second shell member 264 may be spaced apart from the internal surface of the cavity 354. Accordingly, one or more spaces 356 may be defined for receiving a polymeric material for overmolding the second dam members 266 onto the second shell member 264. There may be a space 356 defined for forming the outer skirt 278 as represented in FIG. 9. There may be a similar space for forming the end dam 279.

The polymeric material for forming the second dam members 266 may be chosen to be chemically resistant to the coolant, suitable for overmolding to the second shell member 264, and may be relatively high in heat conductivity. The dam members 266 may be cured within the cavity 354 to thereby form according to the internal surfaces of the cavity 354 and attach to the second shell member 264. Furthermore, there may be internal cooling or heating lines for controlling temperature of the molding system 350. Once formed, there may be additional coatings added or other processing of the second casing member 232 before it is joined to the first casing member 231.

The overmolding system 350 configured so as to increase manufacturing efficiency. For example, the runner system 358 may include a plurality of branches for feeding molten polymer to the cavity 354. At least one of the molds 361a-361c may be disposed between the second shell member 264 and the cavity 354, for example, to form the through-holes 296, 298 discussed above. Stated differently, at least one of the molds 361a-361c may be provided between the detached area 275 and the outer surface of the shell member 264 to form the through-hole 296. The through-hole 298 may be similarly formed. Furthermore, the groove 284 in the skirt 278 may be molded using one or more of the molds 361a-361c. Additionally, the molds 361a, 361b, 361c may be formed, shaped, and configured to allow for accurate and repeatable molding, and also for quick removal of the molded second casing member 232 therefrom. For example, the molds 361a, 361b, 361c may be configured to avoid overhanging one another in the direction that the mold opens. Also, one or more of the molds 361a, 361b, 361c can be a so-called lifter or other part that is designed to move from between such an overhang when the mold opens.

In some embodiments, the dam members 266 may be overmolded and affixed to the outer surface of the second shell member 264. FIGS. 10A-10E illustrate additional embodiments in which the dam members 266 may be affixed to the second shell member 264. These embodiments may also be utilized for affixing the first dam members 236 to the first shell member 234.

Figure 10A:
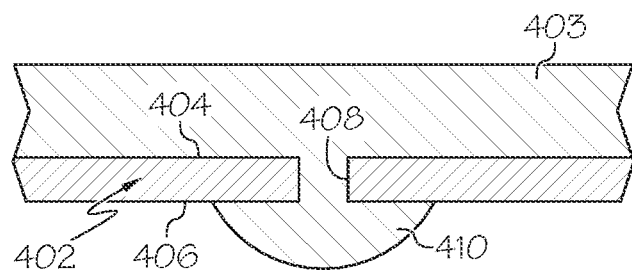
FIGS. 10A-10E are cross-sectional views of the motor case according to example embodiments.

For example, FIG. 10A illustrates an embodiment of a shell member 402, which can represent either the first shell member 234 or the second shell member 264. FIG. 10A also illustrates an embodiment of a dam member 403, which can represent either the first dam member 236 or the second dam member 266. As shown, the shell member 402 may include at least one aperture 408 defined through its thickness. The dam member 403 may be layered over an outer surface 404 of the shell member 402 with part passing through the aperture 408. Also, the dam member 403 may include an enlarged interior part 410 that is engaged on or proximate an inner surface 406 of the shell member 402. The enlarged interior part 410 may be bulbous and may be engaged to the shell member 402 via an interference fit.

Figure 10B:
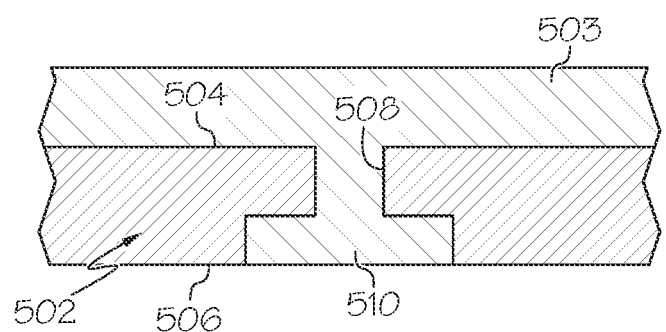

FIG. 10B illustrates additional embodiments of an embodiment of a shell member 502, which can represent either the first shell member 234 or the second shell member 264. FIG. 10B also illustrates an embodiment of a dam member 503, which can represent either the first dam member 236 or the second dam member 266. As shown, the shell member 502 may include at least one aperture 508 defined through its thickness. The dam member 503 may be layered over an outer surface 504 of the shell member 502 with part passing through the aperture 508. Also, the dam member 503 may include an enlarged interior part 510 that is engaged on or proximate an inner surface 506 of the shell member 502. The enlarged interior part 510 may be bulbous and may be received within a corresponding recess on the inner surface 506 to engage with the shell member 402 via an interference fit. The interior part 510 may be flush with surrounding areas of the inner surface 506 in some embodiments.

Figure 10C:
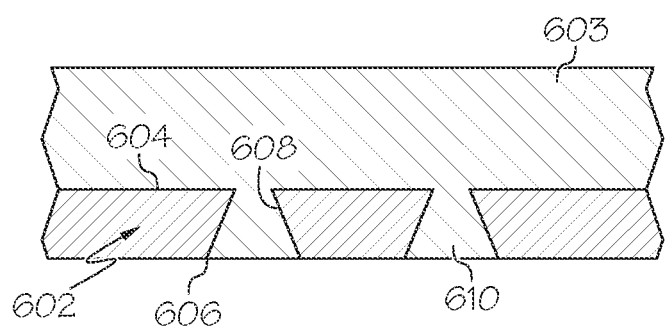

FIG. 10C illustrates further embodiments of a shell member 602, which can represent either the first shell member 234 or the second shell member 264. FIG. 10C also illustrates an embodiment of a dam member 603, which can represent either the first dam member 236 or the second dam member 266. As shown, the shell member 602 may include at least one aperture 608 defined through its thickness. As shown, there may be a plurality of apertures 608, which may be tapered in width. The dam member 603 may be layered over an outer surface 604 of the shell member 602 with part passing through the apertures 608. Also, the dam member 603 may include enlarged interior parts 610 that are received in the tapered apertures 608. Thus, the interior parts 610 may be engaged to the shell member 602 via an interference fit.

Figure 10D:
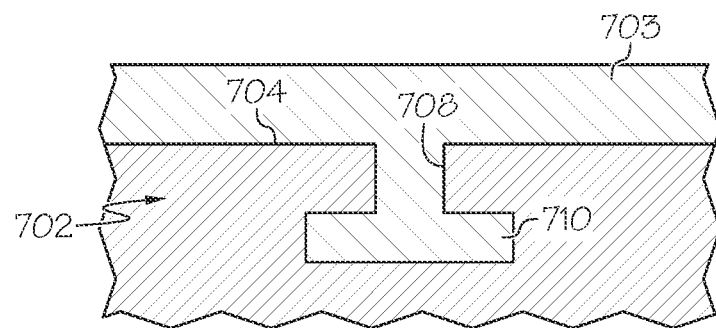

FIG. 10D illustrates further embodiments of a shell member 702, which can represent either the first shell member 234 or the second shell member 264. FIG. 10D also illustrates an embodiment of a dam member 703, which can represent either the first dam member 236 or the second dam member 266. As shown, the shell member 702 may include at least one aperture 708 defined partly through its wall thickness. The dam member 703 may be layered over an outer surface 704 of the shell member 702 with part received within the aperture 708. Also, the dam member 703 may include an enlarged interior part 710 that is received in the aperture 708. The enlarged interior part 710 may have a cruciform shape (e.g., an inverted "T" shape). Thus, the interior part 710 may be engaged to the shell member 702 via an interference fit.

Figure 10E:
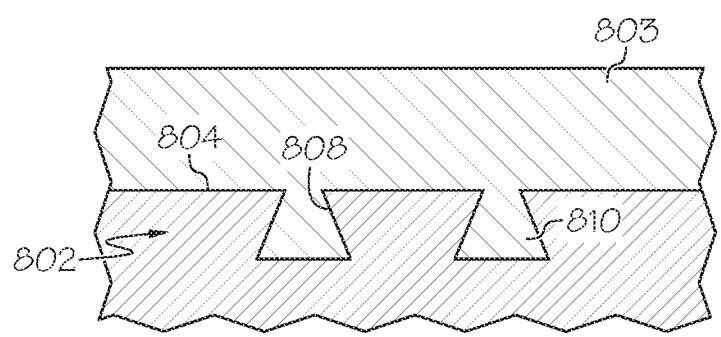

FIG. 10E illustrates further embodiments of a shell member 802, which can represent either the first shell member 234 or the second shell member 264. FIG. 10E also illustrates an embodiment of a dam member 803, which can represent either the first dam member 236 or the second dam member 266. As shown, the shell member 802 may include at least one aperture 808 defined partly through its wall thickness. The dam member 803 may be layered over an outer surface 804 of the shell member 802 with part received within the aperture 808. Also, the dam member 803 may include an enlarged interior part 810 that is received in the aperture 808. The enlarged interior part 810 may have a tapered or wedged shape. Thus, the interior part 810 may be engaged to the shell member 802 via an interference fit.

The motor case 228 may also include other features for attaching the dam members 236, 266. For example, the outer surface of at least one of the shell members 234, 264 may be textured (e.g., mechanically, chemically, and/or laser textured) to increase surface roughness and increase adhesion of the dam members 236, 266 thereto. In additional embodiments, the outer surface the at least one of the shell members 234, 264 may be coined to form a specific feature, and this feature may be used for interlocking to the respective dam member 236, 266.

As discussed above, the motor case 228 may be assembled from the first and second casing members 231, 232 to encapsulate the motor 222. Electrical cords for the motor 222 may be fed through the side opening 276, and the motor case 228 and motor 222 may be installed within the outer housing 204. Coolant may be provided to the coolant jacket 214 as explained above.

Accordingly, the cooling system 250 of the present disclosure provides effective cooling. The cooling system 250, the motor case 228, and more generally, the e-boosting device 100 is highly compact and lightweight. The e-boosting device 100 may be manufactured efficiently and cost effectively. Furthermore, because of these methods of manufacturing, one or more of the shell members 234, 264 may be standardized for different configurations of the motor case. Different configurations of the dam members may be added to the same configurations of the shell members 234, 264 for added design flexibility.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A motor case for encasing an electric motor of an e-boosting device, the electric motor configured to drivingly rotate a rotor of the e-boosting device in rotation about an axis, the motor case configured to be received within an outer housing, the motor case, with the outer housing, configured to cooperatively define a coolant jacket between the motor case and the outer housing, the motor case comprising:
    a shell member that at least partly defines a motor cavity for receiving and encasing the electric motor, the shell member including an outer surface that faces in an outboard direction away from the motor cavity;
    a dam member that is fixed to the shell member, the dam member projecting from the shell member in the outboard direction from the outer surface of the shell member;
    the shell member and the dam member configured to be received within the outer housing with the outer surface spaced away from the outer housing to define the coolant jacket therebetween and with the dam member disposed proximate the outer housing to partition the coolant jacket; and
    the dam member made of a different material from the shell member.

2. The motor case of claim 1, further comprising a sealing member that seals to the dam member and that is configured to seal to the outer housing to define a sealed fluid boundary.

3. The motor case of claim 2, wherein the dam member includes a groove and the sealing member is received within the groove.

4. The motor case of claim 1, wherein the dam member is made of a polymeric material and the shell member is made of a metallic material.

5. The motor case of claim 1, wherein the dam member includes an attached area that is attached to the outer surface of the shell member;
    wherein the dam member includes a detached area that extends from the attached area and that is spaced apart in the outboard direction from the outer surface to at least partly define an aperture.

6. The motor case of claim 1, wherein the dam member is elongate to extend in a circumferential direction about the axis.

7. The motor case of claim 1, wherein the dam member is elongate to extend in a radial direction relative to the axis.

8. The motor case of claim 1, wherein the dam member is elongate to extend in a longitudinal direction relative to the axis.

9. The motor case of claim 1, wherein the shell member is a first shell member, wherein the dam member is a first dam member, and wherein the outer surface is a first outer surface; and
    further comprising a second shell member and a second dam member that is fixed to the second shell member, the second dam member projecting outward from a second outer surface of the second shell member;
    the second dam member and the second outer surface configured to define the coolant jacket and with the second dam member partitioning the coolant jacket, the second dam member made of a different material from the second shell member.

10. The motor case of claim 1, wherein the dam member has a portion received in an aperture of the shell member to attach the dam member to the shell member.

11. The motor case of claim 1, wherein the dam member includes a dam outer surface that is smooth and that is configured to be disposed proximate an opposing inner surface of the outer housing to partition the coolant jacket.

12. The motor case of claim 1, wherein the shell member comprises a formed metal piece and wherein the dam member is an overmolded polymeric piece that is overmolded on the shell member.

13. A motor case for an electric motor of an e-boosting device, the electric motor configured to drivingly rotate a rotor of the e-boosting device in rotation about an axis, the motor case configured to be received within an outer housing to cooperatively define a coolant jacket, the motor case comprising:
    a first shell member that at least partly defines a motor cavity for receiving the electric motor;
    a first dam member that is fixed to the shell member, the dam member projecting from a first outer surface of the first shell member in an outboard direction, the first dam member made from a material different from the first shell member;
    a second shell member and a second dam member that is fixed to the second shell member, the second dam member projecting outward from a second outer surface of the second shell member;
    the first shell member and the first dam member configured to be received within the outer housing to define the coolant jacket and with the first dam member partitioning the coolant jacket; and
    the second dam member and the second outer surface configured to define the coolant jacket and with the second dam member partitioning the coolant jacket, the second dam member made of a different material from the second shell member.

14. The motor case of claim 13, wherein the first dam member is made of a polymeric material and the first shell member is made of a metallic material.

15. The motor case of claim 13, wherein the second shell member is attached to the first shell member with the second shell member and the first shell member cooperatively defining the motor cavity for encasing the electric motor.

16. A method of manufacturing a motor case for an electric motor of an e-boosting device, the electric motor configured to drivingly rotate a rotor of the e-boosting device in rotation about an axis, the motor case configured to be received within an outer housing to cooperatively define a coolant jacket, the method comprising:
    metalforming a first shell member that is metallic to form at least part of a motor cavity for receiving the electric motor; and molding a first dam member onto a first outer surface of the first shell member to be layered on and attached to the first outer surface, the first dam member projecting from the first outer surface in an outboard direction, the first shell member and the first dam member configured to be received within the outer housing to define the coolant jacket and with the first dam member partitioning the coolant jacket;

metalforming a second shell member that is metallic to form another part of the motor cavity for receiving the electric motor;

molding a second dam member onto a second outer surface of the second shell member to be layered on and attached to the second outer surface, the second dam member projecting outwardly from the second outer surface; and further comprising attaching the first shell member to the second shell member to cooperatively house the motor.

17. The method of claim 16, further comprising providing a sealing member that seals to the first dam member to define a sealed fluid boundary for the coolant.

18. The method of claim 16, wherein metalforming the first shell member includes cold working a workpiece to form the first shell member.

19. The method of claim 16, wherein molding the first dam member onto the first outer surface includes forming a through-hole of the motor case, the through-hole configured to receive a coolant flow through the coolant jacket.

20. The method of claim 19, wherein molding the first dam member onto the first outer surface includes providing a mold member between the first dam member and the first shell member to form the first dam member and the through-hole.

* * * * *